United States Patent [19]

Henning

[11] 4,418,655

[45] Dec. 6, 1983

[54] CYLINDER HEAD FOR AIR-COMPRESSING, SELF-IGNITING INJECTION INTERNAL COMBUSTION ENGINE

[75] Inventor: Richard Henning, Munich, Fed. Rep. of Germany

[73] Assignee: Bayerische Motoren Werke Aktiengesellschaft, Munich, Fed. Rep. of Germany

[21] Appl. No.: 365,042

[22] Filed: Apr. 2, 1982

[30] Foreign Application Priority Data

Apr. 2, 1981 [DE] Fed. Rep. of Germany ....... 3113308

[51] Int. Cl.³ ............................ F02F 1/38; F02F 1/42
[52] U.S. Cl. .......................... 123/41.82 R; 123/193 H
[58] Field of Search ...................... 123/41.76, 41.82 R, 123/41.82 A, 41.85, 268, 275, 284, 432, 193 H

[56] References Cited

U.S. PATENT DOCUMENTS 2,788,776  4/1957  Holt .............................. 123/41.82 R
4,106,444  8/1978  Deutschmann et al. ..... 123/41.82 R
4,224,905  9/1980  von Seggern et al. ............. 123/275

*Primary Examiner*—William A. Cuchlinski, Jr.
*Attorney, Agent, or Firm*—Craig & Burns

[57] ABSTRACT

A cylinder head for an air-compressing, self-igniting injection internal combustion engine is disclosed. The cylinder head comprises a substantially plate-shaped cylinder head bottom with adjoining walls of gas exchange ducts and of a secondary combustion chamber separated from each other on the coolant side and exhibiting on the combustion chamber side sealing seats for valves, arranged approximately in a common plane, in the orifices of the gas exchange ducts, and wherein the secondary combustion chamber comprises a combustion port of a cross section smaller as compared with the chamber cross section and the combustion port is oriented approximately centrally toward a relatively wide main web extending between two inlet valves in the cylinder head bottom, characterized in that an outlet valve is arranged in the cylinder head bottom essentially diametrically opposite to an orifice of a single combustion port of the secondary combustion chamber. The improved cylinder head results in a more relatively uniform temperature distribution in the cylinder head bottom.

9 Claims, 3 Drawing Figures

CYLINDER HEAD FOR AIR-COMPRESSING, SELF-IGNITING INJECTION INTERNAL COMBUSTION ENGINE

BACKGROUND AND SUMMARY OF THE INVENTION

The present invention relates to a cylinder head for an air-compressing, self-igniting injection internal combustion engine comprising a substantially plate-shaped cylinder head bottom with adjoining walls of gas exchange ducts and of a secondary combustion chamber separated from each other on the coolant side and exhibiting on the combustion chamber side sealing seats for valves, arranged approximately in a common plane, in the orifices of the gas exchange ducts, wherein the secondary combustion chamber comprises a combustion port of a cross section smaller as compared with the chamber cross section and the combustion port is oriented approximately centrally toward a relatively wide main web extending between two inlet valves in the cylinder head bottom.

In a known diesel internal combustion engine of the aforementioned type, as disclosed in German Patent Application M No. 24807/Ia/46a[2], for example, the cylinder head has a precombustion chamber centrally arranged with respect to the cylinder chamber. The precombustion chamber is connected to the cylinder chamber via an insert which has the same number of combustion ports as the number of valves arranged in the cylinder head bottom. The combustion ports are oriented between the valves in the cylinder head bottom to reduce the thermal stress on the valve disks.

In this known diesel-type internal combustion engine, three or two inlet valves and, respectively, three or two outlet valves are arranged about the cylinder axis within the cylinder projection upon the cylinder head bottom. This valve arrangement, intended for a high specific performance, however, does not make it possible, in conjunction with the central, relatively large-volume precombustion chamber, to achieve a sufficiently intense cooling of the webs between the valves. The webs are under additional thermal load due to the aforedescribed location of the combustion ports. The webs between the hot outlet valves as well as the webs between the hot outlet valves and the relatively cool inlet valves are under an especially high stress. In this system, considerable temperature differences occur at the valve seats, leading disadvantageously to a distortion or warping of the valve seats and the consequent reduced engine power or failure of the engine.

Finally, because the webs in the cylinder head bottom of this known cylinder head are arranged exclusively between the inlet valves and thus are relatively cool, an unfavorable temperature distribution results on the whole. This can result in cracks in the webs as well as in distortion of the valve seats and of the cylinder head bottom, with leakage of the valves and the cylinder head gasket.

German Pat. No. 938,159 discloses a liquid-cooled cylinder head with a turbulence chamber arranged essentially within the projection of the cylinder onto the planar cylinder head bottom. The turbulence chamber is oriented with its combustion port in such a way that the combustion port terminates in a web in the cylinder head bottom between an inlet valve, arranged in a countersunk fashion, and an outlet valve, arranged in a countersunk fashion. For the intense cooling of the web, the inlet and outlet ports constitute, with the outer wall of the turbulence chamber, approximately stellate-disposed ducts associated at the cylinder periphery in the cylinder block and in the cylinder head bottom with cooling water outlet bores. Baffle surfaces in the coolant chamber of the cylinder head are correlated with these outlet bores to achieve an especially efficient cooling effect. Besides the fact that the coolant chamber configuration is complicated from the viewpoint of casting technique, the intense cooling of the cylinder head bottom in the zone of the relatively cold inlet port as compared with the zone of the hot outlet valve as well as of the turbulence chamber leads also in this case to an adverse temperature distribution in the cylinder head bottom with the known disadvantages.

An object of the present invention is to provide a cylinder head of the aforementioned type which avoids these disadvantages associated with known cylinder heads. In particular, an object of the invention is to provide a cylinder head of the type referred to for an injection internal combustion engine wherein the hot zones existing around the outlet valve and the secondary combustion chamber in the cylinder head bottom, and the cold zones existing around inlet valves and/or ports are correleated with one another in such a way that a relatively uniform temperature distribution is attained in the cylinder head bottom.

These and other objects of the invention are attained by providing in a cylinder head of the aforementioned type that an outlet valve is arranged in the cylinder head bottom essentially diametrically opposite to an orifice of a single combustion port of the secondary combustion chamber.

The advantage of the invention resides in the separation of the greatly thermally stressed spots around the secondary combustion chamber and the outlet valve by interposed, intensively cooled zones around the inlet valves and/or ports, wherein the main web exposed to the combustion jet is arranged in the cold zone between the inlet valves. As a result, an extensively uniform temperature distribution is achieved in the cylinder head bottom, which latter exhibits a high fatigue strength even under a high thermal load exerted by engines of great specific performance under load.

DOS [German Unexamined Laid-Open Application] No. 2,139,500 does disclose a diesel-type internal combustion engine with two inlet valves and one outlet valve, but in this engine, equipped with direct injection, the series-disposed inlet valves are located at a parallel spacing from the plane of symmetry of the cylinder, due to the fact that the injection nozzle must be arranged approximately in the center of the cylinder, and the outlet valve is arranged diametrically with respect to an inlet valve asymmetrically to the inlet valves. In a multi-cylinder internal combustion engine, the outlet valve thus is disadvantageously close to the zone of the cylinder head notoriously critical on account of the drop in heat of the neighboring cylinder. This disadvantageous arrangement leads to warping of the cylinder head in the zone of neighboring cylinders, particularly in case of a high specific load, and therefore results in a permanent deformation with insufficient sealing between adjacent cylinders.

This disadvantage has been avoided by the present invention in that, according to a disclosed, preferred embodiment of the invention the cylinder head comprises two inlet valves arranged on respective sides of a first cylinder plane of symmetry and in an approximately contacting to overlapping fashion in regard to a second cylinder plane of symmetry located perpendicularly to the first, wherein the outlet valve and the orifice of the combustion port of the secondary combustion chamber on the cylinder side are arranged centrally in the first cylinder plane of symmetry, and wherein the outlet valve and the orifice are located respectively close to the periphery of a cylinder projection.

This construction achieves a relatively cool zone in a multicylinder internal combustion engine with a cylinder head integrally extending over all cylinders, in the region of the longitudinal line of symmetry thereof, by means of series-disposed inlet ports, wherein the hot spots of the secondary combustion chamber and of the outlet valve are located near the longitudinal sides of the cylinder head. Since in this case a not insubstantial proportion of the heat from each hot spot is carried away via the adjacent cylinder head side, the cylinder head remains relatively cool in its longitudinal line of symmetry area passing over the narrowest gasket sections between neighboring cylinders, and accordingly retains sufficient rigidity for a flawless seal between adjacent cylinders.

This arrangement of the invention furthermore has the advantage that the spacing between the combustion port and the outlet valve, arranged diametrically thereto, is advantageously large for a thermally lesser effect on the outlet valve.

According to a further feature of the invention the cylinder head bottom of the cylinder head is planar and has valve seat rings inserted therein, and respective secondary webs are formed between the valve seat rings of the inlet valves and the valve seat ring of the outlet valve and between the valve seat rings of the inlet valves and a burner insert of the secondary combustion chamber, the secondary webs having a width at their narrowest points of approximately half the width of the main web between the inlet valves. Thus, in the disclosed, preferred embodiment of the invention the diametrically located hot zones are separated from the interposed cold zone constituted by the inlet ports respectively by means of web portions of identical width. Since these web portions are furthermore connected to the main web, exposed to the combustion jet, between the inlet ports, a satisfactory heat distribution in the cylinder head bottom is attained via these secondary webs located away from the combustion jet.

The cylinder head of the invention is also characterized by a coolant chamber for liquid cooling as well as inlet ports and an outlet port extending separately from one another through the coolant chamber wherein the inlet ports terminate on one cylinder head side and the outlet port terminates on the opposite cylinder head side. The walls of the inlet ports in the coolant chamber are arranged, at least in the sections close to the cylinder head bottom, freely exposed all around in the coolant chamber and formed, with respective wall sections of the outlet port and the secondary combustion chamber ducts in the region of the inner surfaces of the secondary webs on the coolant side. The ducts are oriented toward the main web. The inlet ports are provided in the close proximity of the cylinder head bottom and are separated from each other as well as from the outlet port and from the combustion chamber wall. By the separated arrangement of the aformentioned components, they are, on the one hand, exposed to the coolant on all sides and, on the other hand, the cylinder head bottom is intensively cooled by way of the webs between the components. Thus, in the regions of the secondary webs on the coolant side, ducts having a radiating pattern are produced for the coolant by the arrangement of the aforementioned components in the coolant space, these ducts being oriented toward the main web. The ducts are aligned and dimensioned in such a way that the thermally highly stressed main web is intensively cooled by a coolant flowing longitudinally and/or transversely through the cylinder head. Since the cylinder head bottom is also exposed to coolant in the interstices of the outlet and inlet ports and the secondary combustion chamber, the wall thickness of the cylinder head bottom can be adapted better to the requirements in conformance with the amount of cooling obtained at maximum engine power. In this connection it is optically possible, by controlled differences in the wall thickness, to advantageously affect the temperature distribution.

Further, according to the present invention the cylinder head comprises a coolant chamber formed above the cylinder head bottom between the cylinder head sides and a cylinder head cover wall. The outlet port is arranged essentially freely exposed all around in the coolant chamber between the cylinder head bottom and the cylinder head cover wall and terminates in a cylinder head side. The inlet ports are freely exposed all around following the cylinder head bottom, ascend relatively steeply in the coolant chamber, and penetrate the cylinder head cover wall. The ascending inlet ports constitute with the adjacent cylinder head side a section of the coolant chamber. Formed recesses of the cylinder head bottom and of the cylinder head side are arranged freely exposed in the coolant chamber to accommodate the secondary combustion chamber and an insert bore of an injection nozzle. In this way the cylinder head bottom can be cooled intensively by an uninterrupted conductance of coolant and at the same time the cylinder head bottom is rigidified by means of the inlet ports penetrating the cylinder head cover wall and ascending relatively steeply in the coolant chamber.

In a multicylinder injection internal combustion engine with a continuously extending cylinder head, these inlet ports rigidify the cylinder head bottom in the zone of the longitudinal center line with respect to the cover wall and separate the coolant stream in the zone of each cylinder into two partial streams, in case of a cylinder head exposed to longitudinal throughflow. One partial stream is conducted by way of the outlet port which is provided substantially exposed all around in the coolant chamber between the cylinder head bottom and the cylinder head cover wall, whereas the second partial stream is conducted primarily via the secondary combustion chamber. Accordingly, a partial stream of coolant is guided over each hot spot, both partial streams flowing, in the region of the longitudinal line of symmetry of the cylinder head, around the inlet ports which are relatively cool due to the taken-in air. By means of this conductance of coolant, the intensive cooling of the main web is advantageously enhanced. Furthermore, the cylinder head remains rigid in the region of its longitudinal line of symmetry, on account of the intensive cooling, for a flawless sealing action in the zone of adjacent cylinders even at a high specific performance.

The intensive cooling of the cylinder head in the zone of the longitudinal line of symmetry is furthermore promoted according to the invention in that each hot spot is additionally exposed and/or surrounded to or by the coolant from the cylinder block by way of passage openings provided in the cylinder head bottom.

In particular, according to the invention the cylinder head is provided with screw holes between the cylinder head bottom and the cylinder head cover wall in the close proximity of the cylinder head sides. Coolant passages are formed in the cylinder head bottom, the coolant passage openings including a slot-hole-shaped coolant passage opening arranged in the zone of the outlet port between two screw holes and respective coolant passage openings arranged between the secondary combustion chamber and the two adjacent screw holes according to the disclosed, preferred embodiment of the invention.

These and other objects, features and advantages of the present invention will become more apparent from the following description when taken in connection with the accompanying drawings which show, for purposes of illustration only, one preferred embodiment in accordance with the present invention.

DETAILED DESCRIPTION OF THE INVENTION

Figure 1:
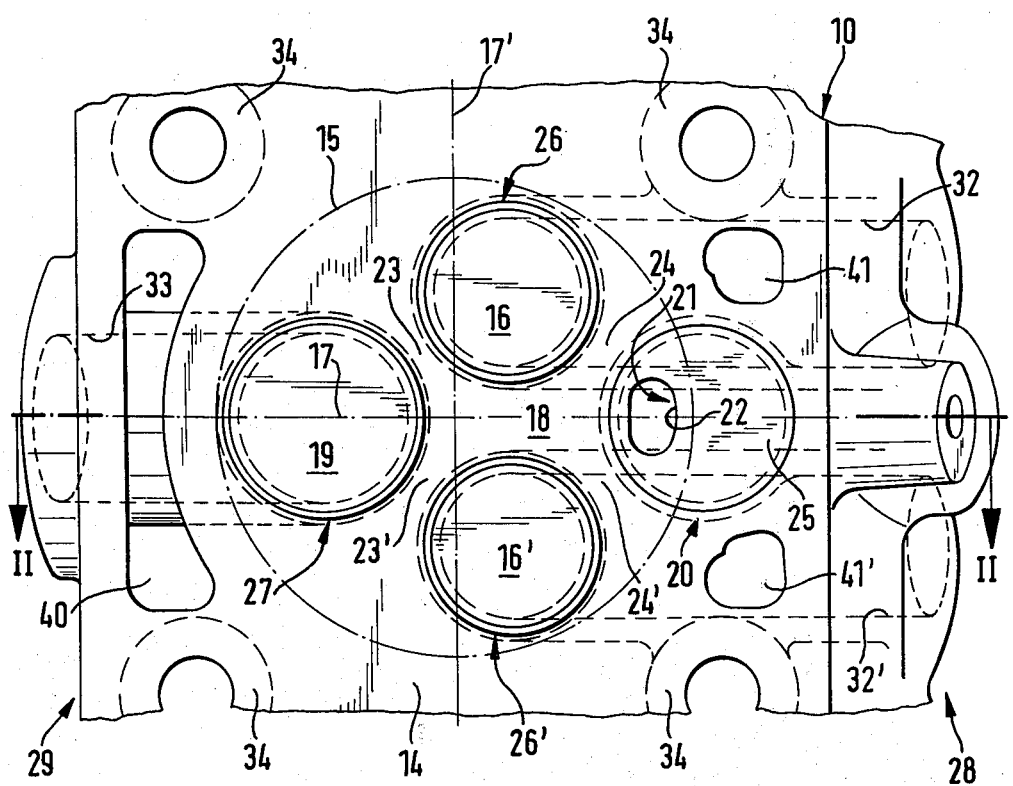
FIG. 1 shows a plan view of the cylinder head bottom of a cylinder head, illustrated in portions, of an air-compressing, self-igniting injection internal combustion engine.
Figure 2:
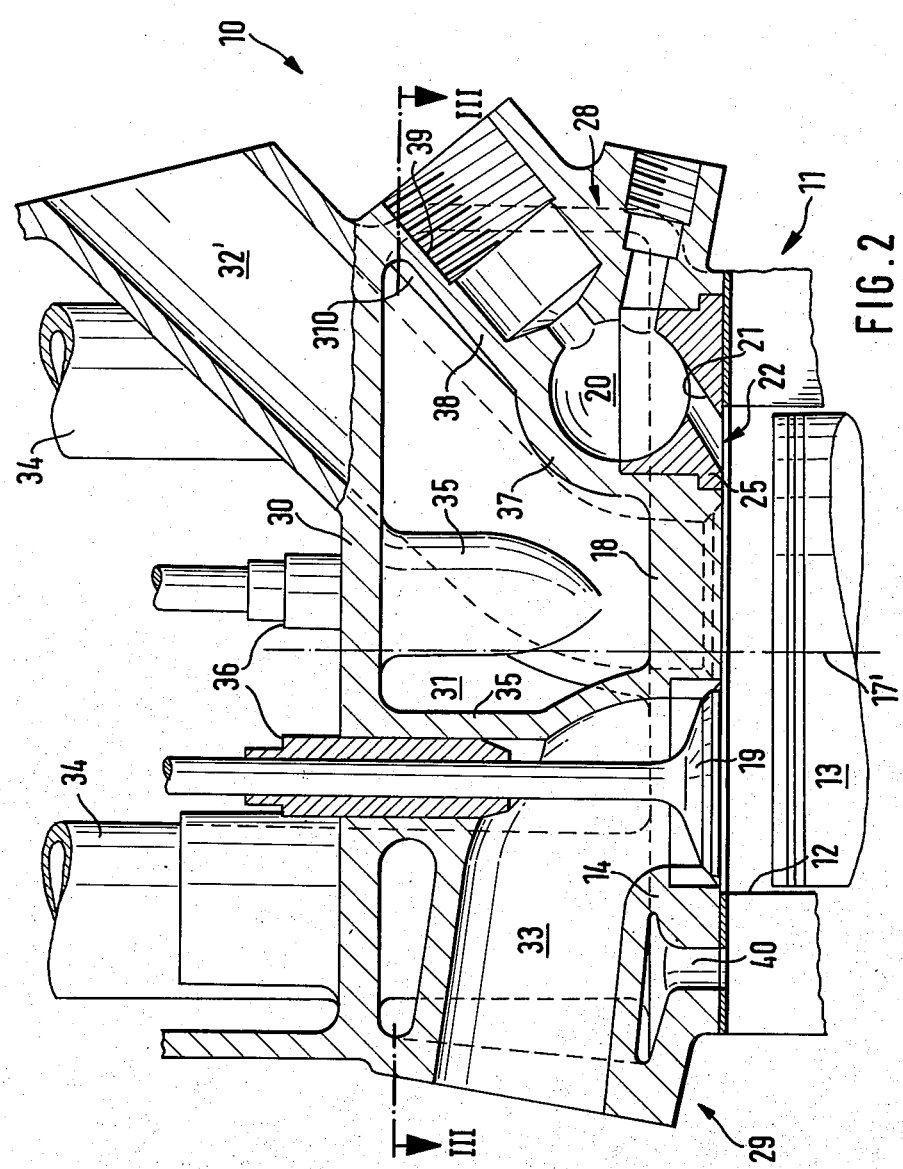
FIG. 2 shows a vertical section through the cylinder head along line II—II in FIG. 1.

In FIG. 1, numeral 10 denotes a cylinder head for an air-compressing, self-igniting injection internal combustion engine indicated in FIG. 2, with a cylinder 12 and a reciprocating piston 13. In the cylinder head bottom 14, within the periphery 15 of the projection of cylinder 12, two inlet valves 16, 16' are arranged on respective sides of a first cylinder plane of symmetry 17. These valves are separated by a main web 18. Furthermore, a single outlet valve 19 is provided within the periphery 15 in the cylinder plane of symmetry 17. The valve 19 is also located centrally with respect to the main web 18. A secondary combustion chamber 20 is arranged in diametrical opposition to the outlet valve 19 in the cylinder plane of symmetry 17 in the cylinder head 10. This secondary combustion chamber lies in part, outside of the periphery 15 of the cylinder projection. The secondary combustion chamber 20 exhibits a single combustion port 21 oriented in the direction of the main web 18 between the inlet valves 16 and 16' toward the outlet valve 19.

To obtain, with inlet valves 16, 16' of a relatively large diameter, at the same time a broad main web 18, the inlet valves 16, 16' are arranged overlapping with respect to a second cylinder plane of symmetry 17' arranged perpendicularly to the first cylinder plane of symmetry 17. In order to produce a long main web 18 and thus to decrease the thermal load on the outlet valve 19, the latter, as well as the secondary combustion chamber 20 with its orifice 22 of the combustion port 21 on the cylinder side are arranged respectively in close proximity to the periphery 15 of the cylinder projection.

As can be seen from FIG. 2, the cylinder head bottom 14 is fashioned to be planar on its side facing the cylinder 12. The following components are located in the cylinder head bottom 14, separated by webs 23, 23' and 24, 24' and 18, respectively: valve seat rings 26, 26' for the inlet valves 16, 16', a valve seat ring 27 for the outlet valve 19, as well as a burner insert 25 for the secondary combustion chamber 20. The arrangement of the webs is such that respective ones of the secondary web 23, 23' and 24, 24' are formed between the inlet valve seat rings 26, 26' and the outlet valve seat ring 27, as well as the burner insert 25. These secondary webs exhibit, at their narrowest points, approximately half the width of the main web 18 between the inlet valves 16, 16'. Consequently, the main web 18, under high thermal stress due to the combustion jet from the secondary combustion chamber 20, is placed, via the secondary webs 23, 23' and 24,24' by means of relatively large heat-conducting cross sections, in communication with the remaining portions of the cylinder head bottom 14.

Figure 3:
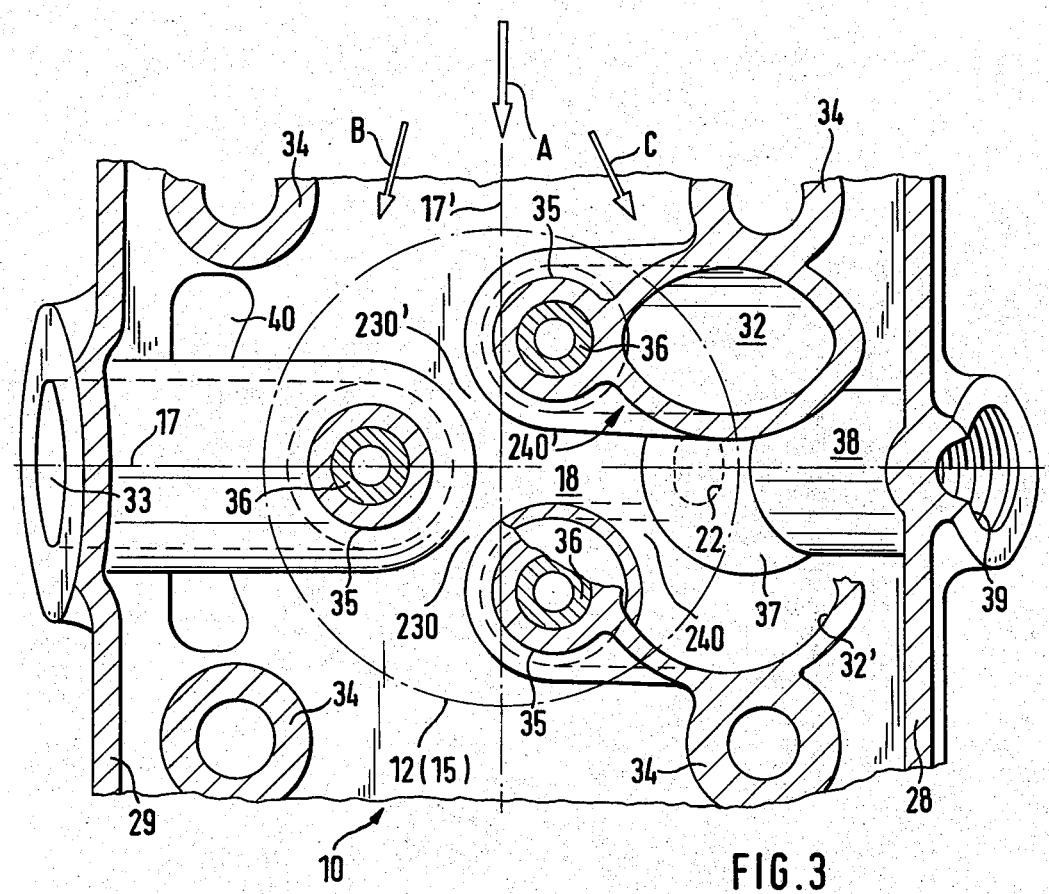
FIG. 3 shows a horizontal section through the cylinder head in the region of the coolant chamber along line III—III in FIG. 2.

It can be seen from FIG. 2 that the cylinder head 10 exhibits a coolant chamber 31 for liquid cooling above the cylinder head bottom 14 between the cylinder head sides 28 and 29 and a cylinder head cover wall 30. Furthermore, FIG. 3 in particular shows that the walls of the ducts 32,32' leading to the inlet valves 16,16' are fashioned, adjacent the cylinder head bottom 14, to be exposed all around and form, with wall sections of the outlet port 33, on the one hand, and with wall sections of the secondary combustion chamber 20, on the other hand, ducts 230, 230' and 240, 240', respectively, in the zone of the inner surfaces of the secondary webs 23,23' and 24,24' on the coolant side—see FIG. 3—these ducts being oriented toward the main web 18. Thus, an uninterrupted conductance of coolant is obtained on the cylinder head bottom 14 above the secondary webs 23,23' and 24,24' toward the main web 18 in the coolant chamber 31, with an intensive cooling of the thermally highly stressed main web 18. It can furthermore be seen from the drawings that the inlet ports 32,32' and the outlet port 33 adjoin the cylinder head bottom 14 respectively with a circular cross section, resulting in a good flow of coolant and avoiding heat accumulation spots in the cylinder head bottom 14. These measures enhances a favorable temperature distribution in the cylinder head bottom 14. However, a favorable temperature distribution is attained, above all, by the fact that the hot zones around the outlet valve 19 and the diametrical secondary combustion chamber 20 are separated by means of cold zones around the inlet ports 32,32' to the inlet valves 16,16' cooled by the supplied fresh air, wherein the thermally highly stressed main web 18 is disposed in the cold zone between the inlet valves 16,16'. By this arrangement of the two inlet valves 16, 16' and the sole outlet valve 19, as well as the secondary combustion chamber 20, the cylinder head 10 is intensively cooled in the region of its line of symmetry which is under great stress thermally and mechanically and therefore exhibits the desired rigidity with favorable wall thicknesses even under a high specific power of engines under load.

The rigidity of the cylinder head 10 is still further increased by constructional measures, in that the inlet ports 32,32' are provided separately and, on the other hand, terminate in the cylinder head cover wall 30 and, on the other hand, are in communication with inlet valves 16, 16' arranged overlapping toward the cylinder plane of symmetry 17'. A special rigidifying of the cylinder head 10 in the zone of the longitudinal line of symmetry is attained especially by the features that the inlet ports 32, 32' ascend relatively steeply following the cylinder head bottom 14, FIG. 2, within the coolant chamber 31, and penetrate through the cylinder head cover wall 30 and that furthermore their walls are fashioned with screw holes 34 for cylinder head screws, not shown, cast integrally with the cylinder head 10, which is made of a light-metal casting, see FIG. 3. Furthermore, the inlet ports 32,32' as well as the outlet port 33, which latter extends substantially exposed all around in the coolant chamber 31 between the cylinder head bottom 14 and the cylinder head cover wall 30 toward the orifice in the cylinder head side 29, are each connected with the cylinder head cover wall 30 by a column 35 which accommodates a valve stem guide means 36.

Accordingly, by means of the arrangement of the three valves according to this invention, a rigid structure is obtained for the cylinder head bottom 14 above the cylinder 12 in the cylinder head 10, with favorable wall thicknesses and a simple configuration of the casting core.

The inlet ports 32, 32', ascending relatively steeply following the inlet valves 16, 16' in the coolant chamber 31, form, together with the adjacent cylinder head side 28, a section 310 of the coolant chamber 31 wherein integrally shaped recesses 37 and 38 of the cylinder head bottom 14 and of the cylinder head side 28 freely extend in the coolant and are centrally disposed with respect to the inlet ports 32,32', in order to accommodate the secondary combustion chamber 20 and the insert bore 39 for an injection nozzle, not illustrated. The sections of the inlet ports 32,32' extending in the coolant chamber 31 to the inlet valves 16,16' arranged in a series in parallel to the second cylinder plane of symmetry 17' accordingly divide a coolant stream penetrating the cylinder head 10 according to arrow "A" in parallel to the cylinder plane of symmetry 17' in the region of the cylinder 12 into the partial streams indicated by arrows "B" and "C". Consequently, the partial streams according to arrows "B" and "C" are respectively supplied to the diametrically mutually opposed hot spots around the outlet valve 19 or the outlet port 33 and the secondary combustion chamber 20 or the shaped recess 37 accommodating same. A proportion of each of the partial streams according to arrows "B" and "C" flows around the respective inlet ports 32,32' cooled by the supplied fresh air and furthermore flows, via the ducts 230, 230' and 240, 240', respectively, around the secondary webs 23,23' and 24,24', as well as the main web 18. The longitudinal flow according to arrow "A" in the cylinder head 10 can be superimposed by mutually opposed transverse streams in the region above the cylinder 12. For this purpose, a passage opening 40 having the shape of a slotted hole is provided, on the one hand, in the zone of the outlet port 33 between neighboring screw holes 34 in the cylinder head bottom 14 and passage openings 41, 41' are provided between the secondary combustion chamber 20 and the respective, adjacent screw holes 34, these openings corresponding with coolant passage openings, not shown, in the cylinder block.

While I have shown and described only one embodiment in accordance with the present invention, it is understood that the same is not limited thereto, but is susceptible to numerous changes and modifications as known to those skilled in the art, and I therefore do not wish to be limited to the details shown and described herein, but intend to cover all such changes and modifications as are encompassed by the scope of the appended claims. I claim:

1. A cylinder head for an air-compressing, self-igniting injection internal combustion engine comprising
   a substantially plate-shaped cylinder head bottom with adjoining walls of gas exchange ducts of a secondary combustion chamber separated from each other on a coolant side and exhibiting on the combustion chamber side sealing seats for valves, arranged approximately in a common plane, in the orifices of the gas exchange ducts, and wherein the secondary combustion chamber comprises a combustion port of a smaller cross-section as compared with the chamber cross-section and the combustion port is oriented approximately centrally toward a relatively wide main web extending between two inlet valves in the cylinder head bottom,
   an outlet valve arranged in the cylinder head bottom essentially diametrically opposite to an orifice of a single combustion port of the secondary combustion chamber,
   wherein the two inlet valves are arranged on respective sides of a first cylinder plane of symmetry and in an approximately contacting-to-overlapping fashion in regard to a second cylinder plane of symmetry located perpendicularly to the first, and
   wherein the outlet valve and the orifice of the combustion port of the secondary combustion chamber on the cylinder side are arranged centrally in the first cylinder plane of symmetry, respectively close to the periphery of a cylinder projection
   whereby a substantially even temperature distribution in the cylinder head bottom is achieved.

2. The cylinder head according to claim 1, wherein said cylinder head bottom is planar and has valve seat rings inserted therein, and wherein respective secondary webs are formed between the valve seat rings of the inlet valves and the valve seat ring of the outlet valve and between the valve seat rings of the inlet valves and a burner insert of the secondary combustion chamber, the secondary webs having a width at their narrowest points of approximately half the width of the main web between the inlet valves.

3. The cylinder head according to claim 2, comprising a coolant chamber for liquid cooling as well as inlet ports and an outlet port extending separately from one another through the coolant chamber, wherein the inlet ports terminate on one cylinder head side and the outlet port terminates on the opposite cylinder head side, and wherein
   the walls of the inlet ports in the coolant chamber are arranged, at least in the sections close to the cylinder head bottom, freely exposed all around in the coolant chamber and
   form with respective wall sections of the outlet port and the secondary combustion chamber ducts in the region of the inner surfaces of the secondary webs on the coolant side, said ducts being oriented toward the main web.

4. The cylinder head according to claim 3, wherein the coolant chamber is formed above the cylinder head bottom between the cylinder head sides and a cylinder head cover wall, wherein the outlet port is arranged essentially freely exposed all around in the coolant chamber between the cylinder head bottom and the cylinder head cover wall and terminates in a cylinder head side, wherein the inlet ports are freely exposed all around following the cylinder head bottom, ascend relatively steeply in the coolant chamber, and penetrate the cylinder head cover wall, wherein the ascending inlet ports constitute with the adjacent cylinder head side a section of the coolant chamber, and wherein formed recesses of the cylinder head bottom and of the cylinder head side are arranged freely exposed in the coolant chamber to accommodate the secondary combustion chamber and an insert bore of an injection nozzle.

5. The cylinder head according to claim 4, wherein screw holes are provided between the cylinder head bottom and the cylinder head cover wall is in the close proximity of the cylinder head sides and coolant passage openings are formed in the cylinder head bottom, said coolant passage openings including a slotted-hole-shaped coolant passage opening arranged in the zone of the outlet port between two screw holes and respective coolant passage openings arranged between the secondary combustion chamber and the two adjacent screw holes.

6. The cylinder head according to claim 1, wherein said cylinder head bottom is planar and has valve seat rings inserted therein, and wherein respective secondary webs are formed between the valve seat rings of the inlet valve and the valve seat ring of the outlet valve and between the valve seat rings of the inlet valves and a burner insert of the secondary combustion chamber, the secondary webs having a width at their narrowest points of approximately half the width of the main web between the inlet valves.

7. The cylinder head according to claim 1, comprising a coolant chamber for liquid cooling as well as inlet ports and an outlet port extending separately from one another through the coolant chamber, wherein the inlet ports terminate on one cylinder head side and the outlet port terminates on the opposite cylinder head side, and wherein the walls of the inlet ports in the coolant chamber are arranged, at least in the sections close to the cylinder head bottom, freely exposed all around in the coolant chamber and form with respective wall sections of the outlet port and the secondary combustion chamber ducts in the region of the inner surface of the cylinder head bottom on the coolant side, said ducts being oriented toward the main web.

8. The cylinder head according to claim 1, wherein a coolant chamber is formed above the cylinder head bottom between the cylinder head sides and a cylinder head cover wall, wherein an outlet port is arranged essentially freely exposed all around in the coolant chamber between the cylinder head bottom and the cylinder head cover wall and terminates in a cylinder head side, wherein inlet ports extend separately from one another through the coolant chamber, the inlet ports being freely exposed all around following the cylinder head bottom, ascending relatively steeply in the coolant chamber and penetrating the cylinder head cover wall, wherein the ascending inlet ports constitute with the adjacent cylinder head side a section of the coolant chamber, and wherein formed recesses of the cylinder head bottom and of the cylinder head side are arranged freely exposed in the coolant chamber to accommodate the secondary combustion chamber and an insert bore of an injection nozzle.

9. The cylinder head according to claim 1, wherein screw holes are provided between the cylinder head bottom and a cylinder head cover wall in the close proximity of the cylinder head sides, and wherein coolant passage openings are formed in the cylinder head bottom, said coolant passage openings including a slotted-hole shaped coolant passage opening arranged in the zone of the outlet port between two screw holes and respective coolant passage openings arranged between the secondary combustion chamber and the two adjacent screw holes.

* * * * *